United States Patent Office 3,254,067
Patented May 31, 1966

3,254,067
STEREOSPECIFIC POLYMERIZATION OF METHYL METHACRYLATE USING AN ORGANOMETALLIC COMPLEX CATALYST
Robert Chiang, Durham, N.C., assignor to Monsanto Company, a corporation of Delaware
No Drawing. Filed Sept. 30, 1964, Ser. No. 400,592
10 Claims. (Cl. 260—89.5)

This invention is a continuation-in-part of application Serial No. 152,022 and now abandoned.

This invention relates to a new process for the stereospecific polymerization of methylmethacrylate and to the crystalline polymer products obtained thereby.

It has long been known that one of the requirements for the crystallization of macromolecules containing asymmetric carbon atoms in the main chain is that sufficiently long stretches of the chain must possess some regularity in the relative steric configuration of adjacent asymmetric carbon atoms. As is also well known, this regularity can take two possible forms which have been designated respectively as "isotactic" and "syndiotactic."

Prior to this invention, it has been possible to produce polymethylmethacrylate with varying degrees of regularity in polymer structure by both the free radical and, more, recently, by ionic-type polymerization techniques. Characteristically, the polymers obtained by these prior processes contain sequences of both isotactic and syndiotactic structures.

To my knowledge, a predominantly syndiotactic polymethylmethacrylate polymer which is free of the isotactic isomer has not been prepared heretofore. There are reported instances of stereoregular polymethylmethacrylate polymers in which the syndiotactic form predominates in the polymer, but the isotactic isomer is also present in a substantial amount. The elimination of the isotactic segments, of course, would result in a polymer having a higher degree of the advantageous regularity.

It is, therefore, an object of this invention to provide a new process for producing a stereoregular, crystalline polymethylmethacrylate polymer which is at least 70 percent syndiotactic and substantially free of the isotactic form.

It is a further object to provide a process for producing predominantly syndiotactic polymethylmethacrylate at practical and convenient temperatures.

It is a still further object of this invention to provide a catalyst system for initiating polymerization of methylmethacrylate to polymethylmethacrylate of an essentially syndiotactic structure.

These and other objects of this invention will become apparent in the ensuing description of the invention.

The objects of this invention are accomplished by conducting the polymerization of methylmethacrylate in a nonaqueous liquid medium in the presence of an organometallic coordination complex.

The complex catalysts or initiators employed in the process of this invention may be represented by the following formula, $$M[AlR_{4-i}(OR')_i]_{m-x}(OR')_x$$

wherein M is a metal selected from the group consisting of an alkali metal and an alkaline earth metal, R is a monovalent hydrocarbon radical having up to 12 carbon atoms, R' is a member selected from the group consisting of hydrogen and a monovalent hydrocarbon radical having up to 12 carbon atoms, $i$ is an integer of from 1 to 4, $m$ is an integer of from 1 to 2 which corresponds to the valence of M and $x$ is a value less than M. In other words $x$ is a member selected from the group consisting of 0 and 1, with the proviso that $x$ is 0 when $m$ is 1.

The initiators of this invention where $i$ is 1 and R' is a monovalent hydrocarbon radical may be prepared by the reaction of an alcohol or phenol having the formula R'OH with an organo aluminum complex having the formula $M[AlR_4]_{m-x}(OR')_x$ in a molar ratio of about $m:1$.

This procedure may be modified by the substitution of less than a stoichiometric amount of molecular oxygen for the alcohol or phenol. When oxygen is employed molar ratios of less than about $0.5m$ mole of $O_2$ per mole of the complex $M[AlR_{4m-x}(OR')_x$ are preferred.

Another method useful in the preparation of the initiators of this invention wherein $i$ is 1 comprises the reaction of an alkali metal or an alkaline earth metal derivative of an alcohol or phenol having the formula $M(OR')_m$ with $AlR_3$ in a equimolar ratio.

Initiators wherein R' is hydrogen may be prepared by employing compounds having the formula $M(OR')_m$ in a manner above described. Suitable reactants of this type are NaOH, Ba(OH)$_2$ or compounds which in the presence of moisture form such bases. For example, MgO may be converted to Mg(OH)$_2$.

If an initiator where $i$ is greater than 1 is desired an excess of the alcohol or phenol employed in the method first described may be employed or the product

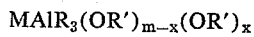

of any of the procedures described may be further reacted with from about $1m$ to about $3m$ moles of reactant having the formula R'OH.

In all of the above described methods for the preparation of the initiators care should be taken to exclude contact of the reactants with oxygen or moisture (except where oxygen or moisture are used as reactants) to preclude contamination of the catalysts and to avoid undesirable side reactions. Usually, the reactions are conducted in an inert liquid medium under an atmosphere of nitrogen, argon or other inert gas. The inert liquid medium must dissolve, partially or completely, one or both of the reactants to provide adequate contact of the reactants. Suitable liquids for conducting the above described reactions are the liquid paraffinic and aromatic hydrocarbons such as butane, hexane, heptane, isooctane, benzene and toluene and mixtures of liquids of this type.

The reactions normally occur spontaneously at ambient temperatures where one or more of the reactants is well dissolved in the liquid medium. Where the reactants are only slightly soluble in the inert liquid medium it may be desirable to raise the temperature to increase the rate of the reaction. Normally, atmospheric pressures are used. However, pressures may be raised or lowered to accommodate procedural techniques. The conditions of temperatures, pressures and time of reaction have not been found to be critical in the preparation of the catalysts. Upon completion of the reaction the product may at least partially precipitate from the liquid medium in which case it may be separated by filtration, care being taken to preclude exposure to air or moisture. In case where the catalyst product is partially or wholly dissolved in the liquid medium it may be isolated by removing the solvent or by low temperature crystallization. Because the catalyst products are oxygen and moisture sensitive they are preferably not isolated prior to use in the polymerization process of this invention. Accordingly, in cases where the catalysts precipitate from the reaction medium, dimethylformamide or other polymerization solvent is desirably added to the reaction medium to dissolve the catalyst for use in a later polymerization process The several reactants employed in the preparation of the organo-aluminum coordinate complexes of this invention are generally known in the art and they are readily available for the preparation of the catalysts of this invention.

Thus, the compounds represented by the formula $AlR_3$ are known in the art. The R radicals may be the same or different aryl, alicyclic or aliphatic radicals having up to about 12 carbon atoms. Suitable aryl radicals are phenyl, tolyl, xylyl and naphthyl for example. Among the alicyclic radicals which may be useful substituents illustrative members are cyclopentyl, methylcyclopentyl, cyclohexyl and cycloheptyl. The aliphatic radicals comprise the straight and branch chain hydrocarbons such as dodecyl, isooctyl, and preferably the lower aliphatic radicas such as ethyl, isopropyl, butyl and hexyl The reactants having the formula $AlR_3$ may be employed as precursors for the complex reactants represented by the formula $M[AlR_4]_m$, the latter being conveniently prepared by reacting $AlR_3$ in a dispersion of an alkali metal or an alkaline earth metal.

The organic reactants R'OH and $M(OR')_m$ are generally known in the art and comprise compounds such as cresol, cyclohexanol, sodium phenolate, sodium isopropoxide, magnesium t-butoxide, lithium amyloxide, ethanol and the like. The R' radicals comprise hydrocarbons having up to about 12 carbon atoms and may be aryl, alicyclic or aliphatic. The hydrocarbon R' radicals conform in scope to those above desrribed for R.

When the initiators are prepared using oxygen, air or oxygen enriched air may be employed. The use of pure oxygen should be avoided or very carefully controlled to preclude the possibility of high velocity reactions.

The polymerization of methylmethacrylate according to this invention is conducted by contacting methylmethacrylate dissolved in a nonaqueous solvent with a catalytic amount of the organoaluminum coordinate complex initiators above described. Care should be taken to preclude contamination of the reaction mixture with oxygen or moisture at least until the desired degree of polymerization is completed. Usually the reaction system is kept under nitrogen or other inert gas.

Any of the well known nonaqueous polymerization solvents which are inert to the reactants may be employed in the practice of this invention. However, the polar solvents such as dimethylformamide (DMF), dimethylacetamide (DMA), dimethylsulfoxide (DMSO) and mixtures of these solvents with other solvents such as toluene are preferred.

The conditions of temperature, pressure, time, catalyst concentration and monomer to solvent ratio may be varied appreciably and have not been found to constitute critical aspects of this invention. Thus, temperatures from about $-25°$ to about $100°$ C. have been found to be operative for polymerization using the novel initiator system herein described, from about $25°$ C. to about $75°$ C. being highly preferred. Atmospheric pressures are normally used. Pressures above or below atmospheric may be employed, if desired, to accommodate procedural techniques. Catalyst concentrations as low as about 0.01 to about 5 percent by weight of the monomer initiate the polymerization. However, use of the catalyst in the higher concentrations is unnecessary to provide the catalytic function and usually result in detectable amounts of initiator fragments in the polymer. The particular concentration of the catalyst may be determined by the desired degree of conversion and the molecolar weights desired. The time necessary for polymerization will of course depend on other conditions such as catalyst concentration, the particular solvent system used and the temperature. Reactions have been conducted for periods of time ranging from less than an hour up to several days. The time for terminating the reaction will be obvious to one skilled in the art. Termination may be accomplished by the use of conventional shortstopping agents such as methanol, water, HCl and the like. The solvent to monomer ratio is not critical and may depend to a large degree on the disposition of the final product. Thus, the polymer may be isolated upon completion of the reaction or the solvent may be increased or decreased to provide a polymer concentration suitable for spinning.

The polymers prepared by this invention may be spun by conventional processes to provide useful textile fibers and filaments. One such spinning process is described by Knudsen in U.S. Patent No. 3,088,188.

As has been previously noted, the polymers obtained in the practice of this invention are crystalline as shown by X-ray diffraction patterns. Further, from nuclear magnetic resonance spectra the polymers are found to be predominantly syndiotactic in form and free or substantially free of the isotactic isomer. By this I mean that the isotactic form is present in amounts of less than about 2 percent based on the overall polymer structure. Thus, typically the polymer structure has been found to be above about 70 percent syndiotactic and less than about 30 percent heterotactic, or of random configuration.

In order to illustrate the invention with greater particularity, the following specific examples are given, it being understood that they are intended to be illustrative and not limitative.

*Example I*

This example illustrates the polymerization method of this invention wherein an organometallic coordination complex obtained by reacting sodium ethoxide (NaOEt) with aluminum triethyl ($AlEt_3$) and represented by the formula $NaAlEt_3OEt$ was employed as an initiator.

The catalyst was prepared in an oxygen-free atmosphere and under anhydrous conditions by mixing one cc. of a 25 percent n-heptane solution of aluminum triethyl (1.68 millimoles per cc. of solution based on Al) with 1.120 gm. (1.74 millimoles) of sodium ethoxide at a temperature of $25°$ C. The reaction mixture was tumbled for about one hour to assure complete reaction. To the catalyst slurry obtained, there was then added with mixing 50 cc. of a dimethyl formamide solvent and 10 cc. of a methyl methacrylate monomer. Polymerization began and was allowed to proceed for four hours at $25°$ C., after which the polymer was recovered by precipitation in methanol. The polymer was then washed with dilute hydrochloric acid and water to remove the inorganic residue. The calculated conversion was 80.9 percent with the polymer having a molecular weight of about 80,000. X-ray diffraction patterns showed the polymer produced to be crystalline, after swelling in heptanone. From an analysis of spectra obtained by nuclear magnetic resonance measurements, it was determined that the polymer structure was 1.7 percent isotactic, 27.7 percent heterotactic and 70.6 percent syndiotactic.

*Example II*

This example illustrates the polymerization procedure of this invention wherein a catalyst obtained by reaction of sodium ethoxide with aluminum triethyl in a molar ratio of 1:1.5 was employed.

The polymerization initiator was prepared in an oxygen-free atmosphere and under anhydrous conditions by mixing 1.5 cc. of a 25 percent n-heptane solution of aluminum triethyl (2.52 millimoles based on Al) with 0.120 gm. (1.74 millimoles) of sodium ethoxide at a temperature of $25°$ C. The reaction mixture was tumbled for about one hour to assure complete reaction.

Polymerization of a methyl methacrylate monomer was then carried out in the same manner as described in Example I. The calculated conversion was 79 percent with the polymer having a molecular weight of about 88,000. X-ray diffraction patterns showed the polymer produced to be crystalline after swelling in heptanone.

*Example III*

This example illustrates the practice of this invention wherein a catalyst obtained by reacting equimolecular proportions of magnesium oxide and aluminum triethyl was employed.

The catalyst was prepared in an oxygen-free atmosphere by mixing a molar quantity of aluminum triethyl in a 25 percent n-heptane solution with a molar quantity of magnesium oxide at a temperature of 25° C. Since no special precautions were taken to eliminate the last traces of moisture, the magnesium oxide reacted as the hydroxide, to provide an initiator represented by the formula Mg(AlEt₃OH)OH.

Polymerization of a methyl methacrylate monomer was then carried out in the same manner as described in Example I with the sole exception being that the reaction was allowed to proceed for one week at 25° C. before the polymer was recovered by precipitation in methanol. The calculated conversion was 26 percent with the polymer having a molecular weight of about 480,000. X-ray diffraction patterns showed the polymer to be crystalline, after swelling in heptanone. An analysis of the spectra obtained in nuclear magnetic resonance measurements indicated that the polymer was 80 percent syndiotactic and 20 percent heterotactic with no detectable isotactic form.

*Example IV*

This example illustrates the polymerization process of this invention wherein a catalyst obtained by reacting equimolecular proportions of sodium hydroxide and aluminum triethyl and represented by the formula $$Na(AlEt_3OH)$$

was employed.

The catalyst was prepared in an oxygen-free atmosphere and under anhydrous conditions by mixing a molar quantity of aluminum triethyl in a 25 percent n-heptane solution with a molar quantity of sodium hydroxide at a temperature of 25° C.

Polymerization of a methyl methacrylate monomer was then carried out in the same manner as described in Example 1. The reaction was allowed to proceed for one week at 25° C. after which the polymer was recovered by precipitation in methanol. The calculated conversion was 10 percent. X-ray diffraction patterns showed the polymer to be crystalline after swelling in heptanone. Nuclear magnetic resonance spectra indicated that the polymer structure was 74 percent syndiotactic, 25.8 percent heterotactic and 0.2 percent isotactic. The spectra of the polymer recovered from the catalyst surface indicated a structure which was 82 percent syndiotactic and 18 percent heterotactic. There was no detectable isotactic form.

The polymers obtained by the methods of this invention are applicable in the end-uses for which conventional polymethylmethacrylates are normally applied. To illustrate, they may be used to fabricate synthetic-glasslike plastics or in sheet, rod and tube casting processes. They find further use in the form of molding powders for injection molding processes.

The foregoing detailed description has been given for clearness of understanding only and unnecessary limitations are not to be construed therefrom. The invention is not limited to the exact details shown and described, since obvious modifications will occur to those skilled in the art.

I claim:

1. A process which comprises polymerizing methylmethacrylate by reacting methylmethacrylate in an inert organic liquid medium under anhydrous conditions in the presence of a catalytic amount of a metallic coordinate complex initiator represented by the formula, $$M[AlR_{4-i}(OR')_i]_{m-x}(OR')_x$$

wherein M is a metal selected from the group consisting of an alkali metal and an alkaline earth metal, R is a monovalent hydrocarbon radical having up to 12 carbon atoms, R' is a member selected from the group consisting of hydrogen and a monovalent hydrocarbon radical having up to 12 carbon atoms, $i$ is an integer of from 1 to 4, $m$ is an integer of from 1 to 2, which corresponds to the valence of M and $x$ is a member selected from the group consisting of 0 and 1, with the proviso that $x$ is 0 where $m$ is 1.

2. A process according to claim 1 wherein $i$ is 1.

3. A process according to claim 1 wherein said contacting is conducted at a temperature of from about −25° C. to about 100° C.

4. A process according to claim 2 wherein M is an alkali metal.

5. A process according to claim 2 wherein M is an alkaline earth metal.

6. A process according to claim 5 wherein the initiator is a complex represented by the formula $$Mg[Al(CH_2CH_3)_3OH]OH$$

7. A process according to claim 4 wherein the initiator is a complex represented by the formula $$NaAl(CH_2CH_3)_3OCH_2CH_3$$

8. A process according to claim 4 wherein the initiator is a complex represented by the formula $$NaAl(CH_2CH_3)_3OH$$

9. A stereoregular homopolymer of methylmethacrylate having a predominately syndiotactic structure and being substantially free of isotactic structure prepared by the process of claim 1.

10. A stereoregular homopolymer of methylmethacrylate having at least about 70 percent syndiotactic structure, and less than about 2 percent isotactic structure prepared by the process of claim 1.

References Cited by the Examiner

UNITED STATES PATENTS

| | | | |
|---|---|---|---|
| 2,910,461 | 10/1959 | Nowlin et al. | 260—94.9 |
| 3,103,503 | 9/1963 | Fox et al. | 260—89.5 |

OTHER REFERENCES

Fox et al.: J. Am. Chem. Soc., vol. 80, pp. 1768–9 (1958).

Miller et al.: J. Pol. Sci., vol. 55, pp. 643–656 (1961).

JOSEPH L. SCHOFER, *Primary Examiner.*

HARRY WONG, *Assistant Examiner.*